US010653998B2

(12) United States Patent
Yamamoto et al.

(10) Patent No.: US 10,653,998 B2
(45) Date of Patent: May 19, 2020

(54) HONEYCOMB STRUCTURE

(71) Applicant: NGK INSULATORS, LTD., Nagoya (JP)

(72) Inventors: Hirotaka Yamamoto, Nagoya (JP); Yudai Kurimoto, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 0 days.

(21) Appl. No.: 15/459,386

(22) Filed: Mar. 15, 2017

(65) Prior Publication Data

US 2017/0274323 A1   Sep. 28, 2017

(30) Foreign Application Priority Data

Mar. 25, 2016 (JP) ................. 2016-061744

(51) Int. Cl.
*B01J 21/04* (2006.01)
*B01J 23/02* (2006.01)
(Continued)

(52) U.S. Cl.
CPC ....... *B01D 53/9418* (2013.01); *B01D 46/247* (2013.01); *B01D 46/2429* (2013.01); *B01D 46/2459* (2013.01); *B01D 46/2474* (2013.01); *B01J 35/04* (2013.01); *F01N 3/2066* (2013.01); *F01N 3/2842* (2013.01); *B01D 2046/2433* (2013.01); *B01D 2046/2437* (2013.01); *B01D 2046/2481* (2013.01);
(Continued)

(58) Field of Classification Search
None
See application file for complete search history.

(56) References Cited

U.S. PATENT DOCUMENTS 6,753,294 B1 * 6/2004 Brisley ............. B01D 53/9431
502/439
9,346,003 B2   5/2016 Suenobu et al.
(Continued)

FOREIGN PATENT DOCUMENTS

JP   2009-536603 A1   10/2009
JP   2010-227767 A1   10/2010
(Continued)

OTHER PUBLICATIONS

U.S. Appl. No. 15/460,381, filed Mar. 16, 2017, Hirotaka Yamamoto et al.
(Continued)

*Primary Examiner* — Haytham Soliman
(74) *Attorney, Agent, or Firm* — Burr & Brown, PLLC

(57) ABSTRACT

A honeycomb structure includes a honeycomb structure body including porous partition walls defining a plurality of cells serving as fluid passages extending from an inflow end face to an outflow end face. A porosity of the partition walls is from 45 to 65%, an open frontal area of pores having an equivalent circle diameter of 10 μm or more is from 20 to 40%, a pore density of pores having an equivalent circle diameter of 10 μm or more is from 350 to 1,000 pores/mm$^2$ and a median opening diameter of the pores having an equivalent circle diameter of 10 μm or more is from 40 to 60 μm, where the median opening diameter is the median value of the equivalent circle diameters.

9 Claims, 3 Drawing Sheets

(51) Int. Cl.
  *B01D 53/94* (2006.01)
  *B01D 46/24* (2006.01)
  *B01J 35/04* (2006.01)
  *F01N 3/20* (2006.01)
  *F01N 3/28* (2006.01)

(52) U.S. Cl.
  CPC .............. *B01D 2255/20738* (2013.01); *B01D 2255/20761* (2013.01); *B01D 2255/502* (2013.01); *B01D 2279/30* (2013.01); *Y02A 50/2325* (2018.01)

(56) References Cited

U.S. PATENT DOCUMENTS

| | | |
|---|---|---|
| 2007/0261378 A1 | 11/2007 | Miao et al. |
| 2010/0242424 A1 | 9/2010 | Harada et al. |
| 2012/0148792 A1* | 6/2012 | Okazaki ................ C04B 35/195 |
| | | 428/116 |
| 2012/0251768 A1 | 10/2012 | Sendo et al. |
| 2012/0317947 A1 | 12/2012 | Okazaki |
| 2013/0059724 A1 | 3/2013 | Hirose et al. |
| 2013/0071608 A1 | 3/2013 | Suenobu et al. |
| 2013/0236687 A1 | 9/2013 | Hirose et al. |
| 2017/0037760 A1* | 2/2017 | Okazaki ................ C04B 16/082 |

FOREIGN PATENT DOCUMENTS

| | | |
|---|---|---|
| JP | 2011-078899 A1 | 4/2011 |
| JP | 2012-206057 A1 | 10/2012 |
| JP | 2013-063422 A1 | 4/2013 |
| WO | 2011/102487 A1 | 8/2011 |
| WO | WO-2015046242 A1 * | 4/2015 ........... C04B 16/082 |

OTHER PUBLICATIONS

U.S. Office Action, U.S. Appl. No. 15/460,381, dated Jul. 27, 2018 (9 pages).
Japanese Office Action (with English translation), Japanese Application No. 2016-061744, dated Aug. 6, 2019 (6 pages).
"Rikagaku Jiten 4th Edition," translated as "Physics and Chemistry Dictionary 4th Edition," Iwanami Shoten Publishers.
Offer of Information (Japanese Application No. 2016-061744) dated Jul. 8, 2019 (with concise explanation of each reference in English).
German Office Action (Application No. 10 2017 002 530.4) dated May 8, 2019 (with English translation).

* cited by examiner

HONEYCOMB STRUCTURE

The present application is an application based on JP-2016-61744 filed on Mar. 25, 2016 with Japan Patent Office, the entire contents of which are incorporated herein by reference.

BACKGROUND OF THE INVENTION

Field of the Invention

The present invention relates to a honeycomb structure. More specifically, the present invention relates to a honeycomb structure which enables a loading amount of a catalyst to be increased and an increase of a pressure loss on its use to be prevented.

Description of the Related Art

In recent years, the awareness of environmental issues has increased in the entire society. In the technical field in which fuel is burned to generate power, various techniques have been developed to remove harmful components such as nitrogen oxides from the exhaust gas generated, for example, when fuel is burned. For example, to remove harmful components such as nitrogen oxides from the exhaust gas emitted from automobile engines, various techniques have been developed. To remove a harmful component in such an exhaust gas, a catalyst is typically used to cause the harmful component to undergo chemical reaction into another component that is comparatively harmless. As a catalyst carrier for loading the catalyst for purification of an exhaust gas, a honeycomb structure is used.

As a conventional honeycomb structure for such a purpose, a honeycomb structure including a honeycomb structure body has been disclosed. This honeycomb structure body includes porous partition walls defining a plurality of cells serving as fluid passages extending from an inflow end face to an outflow end face (for example, see Patent Document 1). Patent Document 1 discloses a honeycomb structure in which the porosity and the average pore diameter of the partition walls are specified within particular ranges.

[Patent Document 1] JP-A-2013-63422

SUMMARY OF THE INVENTION

As the regulation of exhaust gas has been more strict, and a loading amount of a catalyst loaded onto a honeycomb structure used as a member for purification of an exhaust gas has been on an increasing trend in recent years. In other words, to meet a stricter value of regulation of exhaust gas, it has been studied to allow a loading amount of a catalyst to be increased in the honeycomb structure and to improve the purification performance of a honeycomb structure.

When a conventional honeycomb structure is loaded with a catalyst in such an amount as to meet a strict value of regulation of exhaust gas, the passages (i.e., cells) defined by partition walls may become narrow to increase the pressure loss of the honeycomb structure. For example, when the ceramic honeycomb structure disclosed in Patent Document 1 is loaded with a catalyst in such an amount as to meet a stricter value of regulation of exhaust gas, the pressure loss is markedly increased to cause practical problems.

The present invention has been developed in view of problems of such conventional technologies. According to the present invention, there is provided a honeycomb structure in which enables a loading amount of a catalyst to be increased and an increase of a pressure loss on its use to be prevented.

According to the present invention, the following honeycomb structures are provided.

According to a first aspect of the present invention, a honeycomb structure includes a honeycomb structure body. The honeycomb structure body includes porous partition walls defining a plurality of cells serving as fluid passages extending from an inflow end face to an outflow end face. A porosity of the partition walls is from 45 to 65%. An open frontal area of pores having an equivalent circle diameter of 10 μm or more among pores open on surfaces of the partition walls is from 20 to 40%. A pore density of pores having an equivalent circle diameter of 10 μm or more among pores open on surfaces of the partition walls is from 350 to 1,000 pores/mm$^2$. A median opening diameter of pores having an equivalent circle diameter of 10 μm or more among pores open on surfaces of the partition walls is from 40 to 60 μm, where the median opening diameter is a median value of the equivalent circle diameters.

According to a second aspect of the present invention, the honeycomb structure according to the first aspect is provided, wherein a circularity of pores having an equivalent circle diameter of 10 μm or more among pores open on surfaces of the partition walls is from 1.8 to 4.0.

According to a third aspect of the present invention, the honeycomb structure according to the first or second aspects is provided, wherein a thickness of the partition wall is from 89 to 203 μm.

According to a fourth aspect of the present invention, the honeycomb structure according to any one of the first to third aspects is provided, wherein a cell density of the honeycomb structure body is from 31 to 140 cells/cm$^2$.

According to a fifth aspect of the present invention the honeycomb structure according to any one of the first to fourth aspects is provided, wherein a material of the partition walls includes at least one material selected from the group consisting of cordierite, silicon carbide, silicon nitride, and mullite.

According to a sixth aspect of the present invention, the honeycomb structure according to any one of the first to fifth aspects is provided, further comprising a plugging portion configured to plug either one end of the cells formed in the honeycomb structure body.

According to a seventh aspect of the present invention, the honeycomb structure according to any one of the first to sixth aspects is provided, wherein a catalyst for purification of an exhaust gas is loaded onto at least one of the surfaces of the partition walls and pores of the partition walls of the honeycomb structure body.

According to an eighth aspect of the present invention, the honeycomb structure according to the seventh aspect is provided, used for a purification of NOx contained in an exhaust gas emitted from an automobile.

According to a ninth aspect of the present invention, the honeycomb structure according to the seventh or eighth aspects is provided, wherein the catalyst is a catalyst having a selective catalytic reduction function.

The honeycomb structure of the present invention enables a loading amount of a catalyst to be increased and an increase of a pressure loss on its use to be prevented. The honeycomb structure of the present invention has also an excellent isostatic strength. In particular, the honeycomb structure of the present invention is characterized in that the partition walls have a predetermined porosity, and the open frontal area, the pore density, and the median opening diameter of the pores having a specified size are regulated. The honeycomb structure of the present invention can effectively reduce the pressure loss on its use even when a comparatively large amount of a catalyst is loaded onto the partition walls. Accordingly, a larger amount of a catalyst can be loaded onto the honeycomb structure of the present invention and the structure can be used as an exhaust gas purification member having an excellent purification performance.

DESCRIPTION OF THE PREFERRED EMBODIMENTS

Embodiments of the present invention will now be described. The present invention is not limited to the following embodiments. It should be understood that changes, improvements, and other modifications may be appropriately made in the embodiments described below on the basis of ordinary knowledge of a person skilled in the art without departing from the scope of the present invention.

(1) Honeycomb Structure

Figure 1:
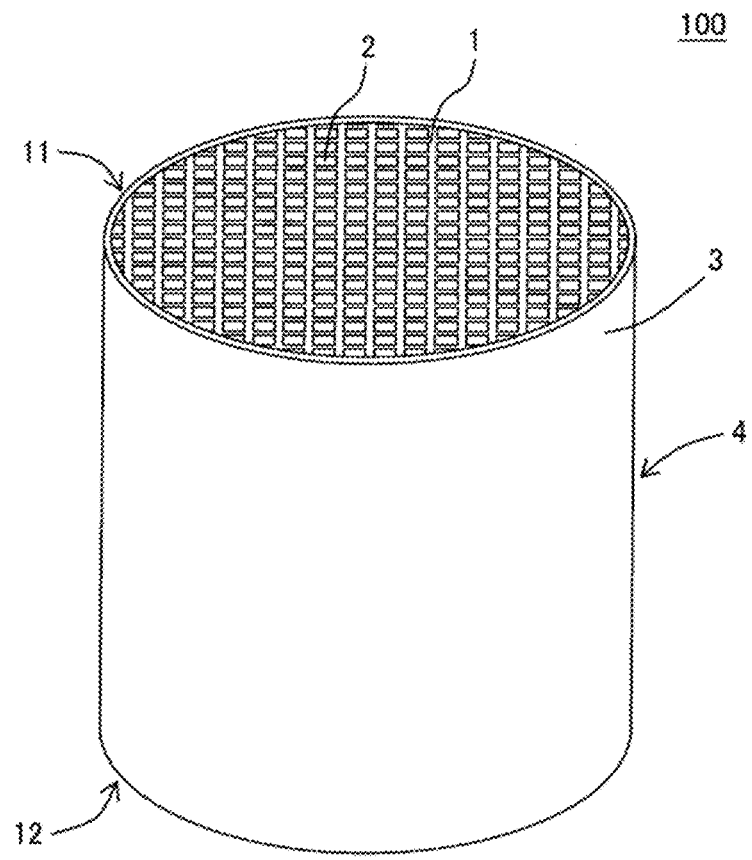
FIG. 1 is a schematic perspective view showing a honeycomb structure according to an embodiment of the present invention.
Figure 2:
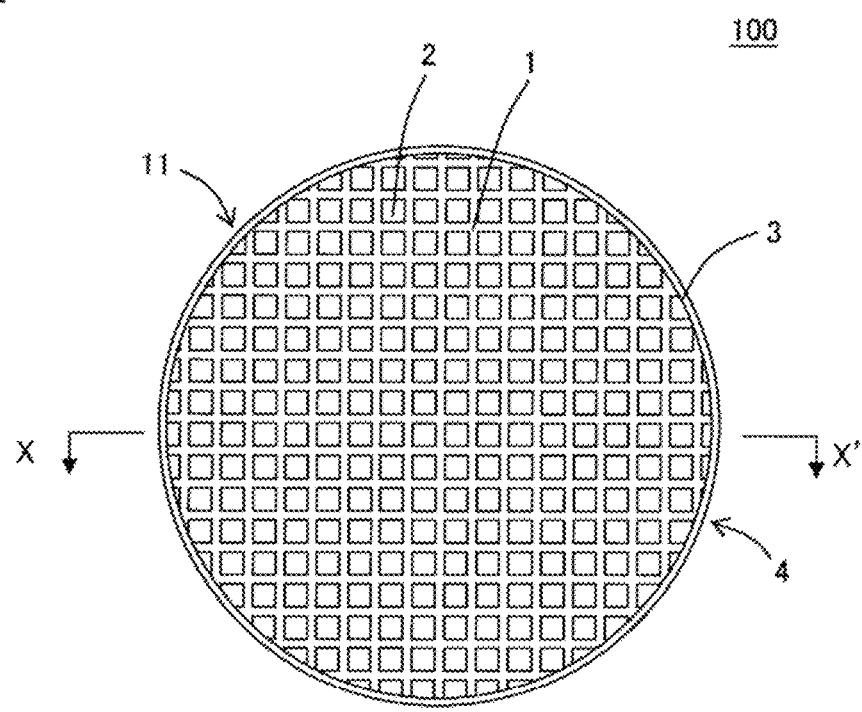
FIG. 2 is a schematic plan view showing an inflow end face of the honeycomb structure shown in FIG. 1.
Figure 3:
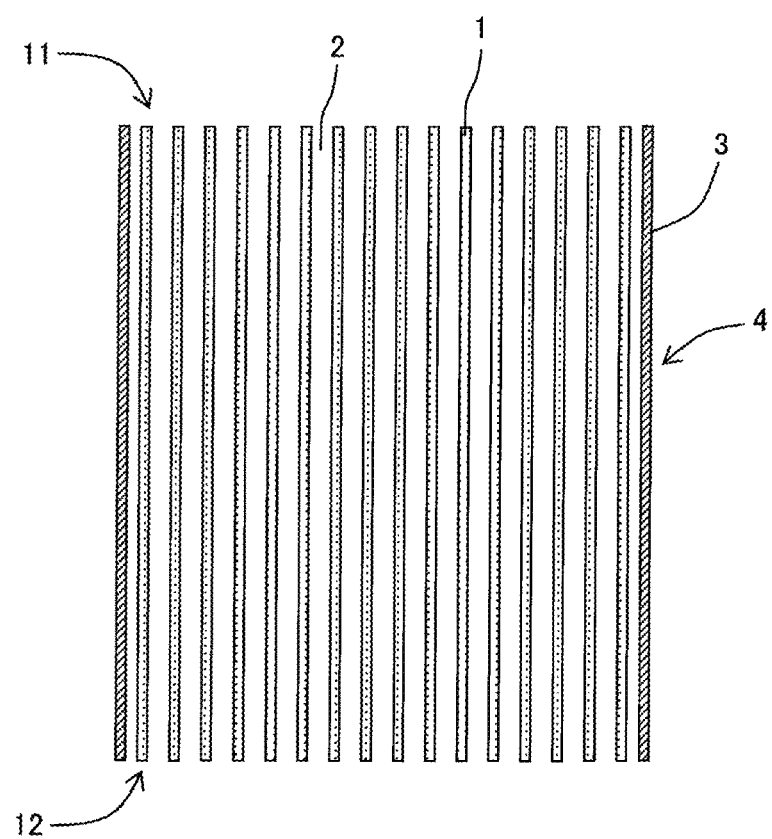
FIG. 3 is a schematic cross-sectional view taken along the line X-X' in FIG. 2.

As shown in FIG. 1 to FIG. 3, a honeycomb structure according to an embodiment of the present invention is a honeycomb structure 100 including a honeycomb structure body 4 including porous partition walls 1. The porous partition walls 1 define a plurality of cells 2 serving as fluid passages extending from an inflow end face 11 to an outflow end face 12.

The honeycomb structure body 4 shown in FIG. 1 to FIG. 3 includes a circumferential wall 3 arranged so as to surround a circumference of the partition walls 1 defining the cells 2. Here, FIG. 1 is a schematic perspective view showing a honeycomb structure according to an embodiment of the present invention. FIG. 2 is a schematic plan view showing the inflow end face of the honeycomb structure shown in FIG. 1. FIG. 3 is a schematic cross-sectional view taken along the line X-X' in FIG. 2.

The honeycomb structure 100 is characterized by including the honeycomb structure body 4 having the following structure. First, in the honeycomb structure body 4, a porosity of the partition walls 1 is from 45 to 65%. An open frontal area of the pores having an equivalent circle diameter of 10 µm or more among pores open on surfaces of the partition walls 1, is from 20 to 40%. A pore density of the pores having an equivalent circle diameter of 10 µm or more among pores open on surfaces of the partition walls 1 is from 350 to 1,000 pores/mm². In addition, a median opening diameter of pores having an equivalent circle diameter of 10 µm or more among pores open on surfaces of the partition walls 1 is from 40 to 60 where the median opening diameter is a median value of the equivalent circle diameters.

The honeycomb structure of the embodiment enables a loading amount of a catalyst to be increased and an increase of a pressure loss on its use to be prevented. The honeycomb structure of the embodiment has also an excellent isostatic strength. In other words, the honeycomb structure of the embodiment can effectively reduce the pressure loss on its use even when a comparatively large amount of a catalyst is loaded onto the partition walls. Hence, a larger amount of a catalyst can be loaded onto the honeycomb structure of the embodiment and the honeycomb structure can be used as an exhaust gas purification member having an excellent purification performance.

In the honeycomb structure of the embodiment, the porosity of the partition walls is values measured with a mercury porosimeter. The mercury porosimeter includes Autopore 9500 manufactured by Micromeritics. The porosity of the partition walls can be measured by the following procedure. First, a sample having a size of a length of 10 mm, a width of 10 mm, and a height of 10 mm is cut out from a honeycomb structure. Then, the pore volume of the sample is measured by the mercury porosimetry, and the porosity of the partition walls is calculated from the measured pore volume. When the porosity of the partition walls is less than 45%, the pressure loss of the honeycomb structure onto which the catalyst is loaded markedly increases even though the other requirements for the honeycomb structure of the embodiment are satisfied. When the porosity of the partition walls exceeds 65%, the isostatic strength of the honeycomb structure deteriorates even though the other requirements are satisfied. The porosity of the partition walls is from 45 to 65%, preferably from 45 to 60%, and particularly preferably from 45 to 55%.

In the present specification, the "equivalent circle diameter" is referred to as the diameter of a circle having the same area as the opening area of a pore. For example, when a pore has an open end that is not a circle, the area of the open end of the pore on a partition wall surface is determined, and then the equivalent circle diameter of the pore is calculated as two times the square root of the quotient of the area divided by the circular constant.

The equivalent circle diameter of a pore can be determined by the following procedure. First, a measurement sample having a size of a length of 20 mm, a width of 20 mm, and a height of 20 mm is cut out from a honeycomb structure body. SEM images are photographed in randomly three visual fields on the surface of a partition wall of the sample under a scanning electron microscope (SEM). The size of a visual field is the width between partition walls and a length of 2 mm in the cell extending direction. The photographing magnification is not limited to particular values and is preferably 60 times. Next, each recorded image is binarized by an image analysis into cavity portions (i.e., pore portions) and portions other than the cavities (i.e., actual partition wall portions). The area of each cavity portion is determined. From the determined area, the equivalent circle diameter of each cavity portion is calculated. As the scanning electron microscope, S-3400N (trade name) manufactured by Hitachi High-Technologies can be used. The image analysis of a recorded image can be performed by using an image processing software, Image-Pro Plus (trade name) manufactured by Media Cybernetics, for example.

In the honeycomb structure of the embodiment, the above method classifies the pores open on the partition wall surface into pores having an equivalent circle diameter of 10 µm or more and pores having an equivalent circle diameter of less than 10 µm. The honeycomb structure of the embodiment is configured that the open frontal area, the pore density, and the median opening diameter of the pores having an equivalent circle diameter of 10 μm or more are controlled to specific values.

In the honeycomb structure of the embodiment, the open frontal area of the pores having an equivalent circle diameter of 10 μm or more is from 20 to 40%. When the open frontal area is less than 20%, the pressure loss of a honeycomb structure loaded with a catalyst markedly increases even though the other requirements are satisfied. When the open frontal area exceeds 40%, the isostatic strength of a honeycomb structure deteriorates even though the other requirements are satisfied. The open frontal area of the pores having an equivalent circle diameter of 10 μm or more is from 20 to 40%, preferably from 20 to 35%, and particularly preferably from 25 to 35%.

The open frontal area of the pores having an equivalent circle diameter of 10 μm or more can be obtained by using the image analysis result for determining the equivalent circle diameter of pores. For example, in each image of three visual fields for determining the equivalent circle diameter of pores, the area of the cavity portions corresponding to the "pores having an equivalent circle diameter of 10 μm or more" is determined. The "open frontal area of the pores having an equivalent circle diameter of 10 μm or more" is calculated as the percentage of the determined area of the cavity portions divided by the area of the whole image. Here, the open frontal area of the pores having an equivalent circle diameter of 10 μm or more is the arithmetic mean value of the open frontal areas in the respective SEM images.

In the honeycomb structure of the embodiment, the pore density of the pores having an equivalent circle diameter of 10 μm or more is from 350 to 1,000 pores/mm$^2$. The "pore density of the pores having an equivalent circle diameter of 10 or more" is referred to as the number of the pores that have an equivalent circle diameter of 10 μm or more and are open per 1 mm$^2$ in a partition wall surface. When the pore density is less than 350 pores/mm$^2$, the pressure loss of a honeycomb structure loaded with a catalyst markedly increases even though the other requirements are satisfied. When the pore density exceeds 1,000 pores/mm$^2$, the isostatic strength of a honeycomb structure deteriorates even though the other requirements are satisfied. The pore density of the pores having an equivalent circle diameter of 10 μm or more is from 350 to 1,000 pores/mm$^2$, preferably from 400 to 900 pores/mm$^2$, and particularly preferably from 500 to 600 pores/mm$^2$.

The pore density of the pores having an equivalent circle diameter of 10 μm or more can be determined by using the image analysis result for determining the equivalent circle diameter of pores. For example, in each image of three visual fields for determining the equivalent circle diameter of pores, the number of the cavity portions corresponding to "the pores having an equivalent circle diameter of 10 μm or more" is determined. The "pore density of the pores having an equivalent circle diameter of 10 μm or more" is calculated as the determined number of the cavity portions divided by the area (mm$^2$) of the whole image. Here, the pore density of the pores having an equivalent circle diameter of 10 μm or more is the arithmetic mean value of the pore densities in the respective SEM images.

In the honeycomb structure of the embodiment, the median opening diameter of the pores having an equivalent circle diameter of 10 μm or more is from 40 to 60 μm, where the median opening diameter is the median value of the equivalent circle diameters. Hereinafter, the "median opening diameter of pores having an equivalent circle diameter of 10 μm or more, where the median opening diameter is the median value of the equivalent circle diameters", is simply referred to as the "median opening diameter of pores having an equivalent circle diameter of 10 μm or more". The "median opening diameter of pores having an equivalent circle diameter of 10 μm or more" can be determined by the following procedure. First, the equivalent circle diameters of pores open on a partition wall surface are determined by the above method. On the basis of the determined equivalent circle diameters, a graph is prepared, where the vertical axis is a cumulative area (%) of pores open on the partition wall surface, and the horizontal axis is an equivalent circle diameter (μm). In the prepared graph, the value of the equivalent circle diameter (μm) of pores at the cumulative area corresponding to 50% of the total pore area is the "median opening diameter of the pores having an equivalent circle diameter of 10 μm or more". The cumulative area corresponding to 50% of the total pore area is the value at which the value of the vertical axis representing cumulative area is 50% in the graph.

When the median opening diameter of pores having an equivalent circle diameter of 10 μm or more is less than 40 μm, a catalyst is hard to penetrate through the pores into the partition walls even though the other requirements are satisfied. When a fixed amount of a catalyst is loaded onto such a honeycomb structure, a large amount of the catalyst is loaded onto the partition wall surface, and the pressure loss of the honeycomb structure markedly increases. When the median opening diameter exceeds 60 μm, the isostatic strength of a honeycomb structure deteriorates even though the other requirements are satisfied. The median opening diameter of the pores having an equivalent circle diameter of 10 μm or more is from 40 to 60 μm, preferably from 45 to 55 μm, and particularly preferably from 50 to 55 μm.

In the honeycomb structure of the embodiment, the circularity of the pores having an equivalent circle diameter of 10 μm or more among the pores open on the surfaces of the partition walls is preferably from 1.8 to 4.0. The circularity of pores having an equivalent circle diameter of 10 μm or more is calculated by the following procedure. First, the opening area of a pore P whose circularity is to be obtained is regarded as $A_0$, and the outline length of the pore is regarded as L. The area of a circle having a circumferential length equal to the outline length L is regarded as $A_1$. The circularity of the pore P can be determined in accordance with $A_1/A_0$. The circularity of pores having an equivalent circle diameter of 10 μm or more can be determined by using the image analysis result for determining the equivalent circle diameter of pores. For example, in each image of three visual fields for determining the equivalent circle diameter of pores, the circularity of a cavity portion corresponding to "pores having an equivalent circle diameter of 10 μm or more" is determined by the above method. The obtained value is the circularity of each pore. Here, the circularity of pores having an equivalent circle diameter of 10 μm or more is the arithmetic mean value of the circularities of the respective "pores having an equivalent circle diameter of 10 μm or more" in the SEM images.

When the circularity of pores having an equivalent circle diameter of 10 μm or more is less than 1.8, the contact area between an exhaust gas and a catalyst is reduced even though the other requirements are satisfied, and thus such a condition is unfavorable. When the circularity of pores having an equivalent circle diameter of 10 μm or more exceeds 4.0, the pressure loss of a honeycomb structure may increase even though the other requirements are satisfied, and thus such a condition is unfavorable. The circularity of pores having an equivalent circle diameter of 10 μm or more is more preferably from 1.8 to 3.0 and particularly preferably from 1.8 to 2.5.

In the honeycomb structure of the embodiment, a thickness of the partition walls is preferably from 89 to 203 μm, more preferably from 114 to 203 μm, and particularly preferably from 114 to 140 μm. When the thickness of the partition walls is less than 89 μm, the isostatic strength of a honeycomb structure body may deteriorate. In addition, the amount of a catalyst capable of being loaded in the pores of the partition walls is reduced, and the pressure loss of a honeycomb structure may increase when a catalyst is loaded onto in an amount more than a particular amount. When the thickness of the partition walls exceeds 203 μm, the excess thickness of the partition walls may allow the pressure loss to increase at the time of use.

In the honeycomb structure of the embodiment, the cell density is preferably from 31 to 140 cells/cm$^2$, more preferably from 47 to 93 cells/cm$^2$, and particularly preferably from 47 to 62 cells/cm$^2$. When the cell density is less than 31 cells/cm$^2$, the purification performance of a honeycomb structure used as a catalyst carrier may deteriorate. When the cell density exceeds 140 cells/cm$^2$, the pressure loss may increase at the time of use.

There is not any special restriction on a material of the honeycomb structure body. The material for the partition walls of the honeycomb structure body includes ceramics. In particular, in the honeycomb structure of the embodiment, the partition walls are preferably formed from at least one material selected from the group consisting of cordierite, silicon carbide, aluminum titanate, silicon nitride, and mullite. The partition walls are more preferably formed from at least one material of cordierite, aluminum titanate, and silicon carbide. The component of the partition walls particularly preferably contains 85% by mass or more of cordierite.

There is not any special restriction on a cell shape of cells formed in the honeycomb structure body. The cell shape of the cells in a cross section perpendicular to the extending direction of the cells can include a polygonal shape, a circular shape, and an elliptical shape. The polygonal shape may include a triangular shape, a quadrangular shape, a pentagonal shape, a hexagonal shape, and an octagonal shape. As for the cell shape, all the cells may have the same shape, or the cells may have different shapes each other. For example, quadrangular cells and octagonal cells may be mixed. As for the cell size, all the cells may have the same size, or the cells may have different sizes each other. For example, of a plurality of cells, some cells may have a larger size, and the other cells may have a smaller size.

There is not any special restriction on a shape of a honeycomb structure body. The shape of the honeycomb structure body may include a pillar shape in which the inflow end face and the outflow end face include a circular shape, an elliptical shape, a polygonal shape. For example, when the inflow end face and the outflow end face have a circular shape, the shape of the honeycomb structure body is a round pillar shape. The polygonal shape includes a quadrangular shape, a pentagonal shape, a hexagonal shape, a heptagonal shape, and an octagonal shape.

The sizes of the honeycomb structure body, for example, the length from the inflow end face to the outflow end face and the sizes of a cross section perpendicular to the cell extending direction in the honeycomb structure body are not limited to particular values. Each size can be appropriately set so as to achieve the optimum purification performance when the honeycomb structure of the embodiment is used as a member for purification of an exhaust gas. For example, the length from the inflow end face to the outflow end face of the honeycomb structure body is preferably from 76 to 254 mm and particularly preferably from 102 to 203 mm. The area of a cross section perpendicular to the cell extending direction in the honeycomb structure body is preferably from 2,027 to 99,315 mm$^2$ and particularly preferably from 16,233 to 85,634 mm$^2$.

In the honeycomb structure of the embodiment, a catalyst for purification of an exhaust gas may be loaded onto at least one of the surface of each partition wall and each pore of the partition wall of the honeycomb structure body. This honeycomb structure enables CO, NOx, HC, and the like in an exhaust gas to undergo catalytic reaction into harmless substances. A catalyst may preferably include a catalyst containing at least one element selected from the group consisting of noble metals, aluminum, nickel, zirconium, titanium, cerium, cobalt, manganese, zinc, copper, tin, iron, niobium, magnesium, lanthanum, samarium, bismuth, and barium. The noble metal may include platinum, rhodium, palladium, ruthenium, indium, silver, and gold. The above element may be contained as an elemental metal, a metal oxide, or other metallic compounds. In the honeycomb structure of the embodiment, the catalyst is more preferably a catalyst having a selective catalytic reduction function. The catalyst having a selective catalytic reduction function may include a metal-substituted zeolite. The metal for the metal substitution of zeolite may include iron and copper. The zeolite may preferably include β-zeolite. The catalyst having a selective catalytic reduction function may be a catalyst containing at least one substance selected from the group consisting of vanadium and titania, as the main component. In the catalyst having a selective catalytic reduction function, the content of vanadium and titania is preferably 60% by mass or more.

The loading amount of the catalyst is preferably 150 g/L or more, more preferably 200 g/L or more and 350 g/L or less, and particularly preferably 250 g/L or more and 350 g/L or less. When the loading amount of the catalyst is less than 150 g/L, the catalytic action may not be sufficiently exhibited. When the loading amount of the catalyst exceeds 350 g/L, the loaded catalyst may increase the pressure loss, or the production cost of a honeycomb structure may increase. The loading amount of a catalyst is the mass [g] of a catalyst loaded per 1 liter of a honeycomb structure. The method of loading a catalyst may include a method in which partition walls are wash-coated with a catalyst liquid containing a catalyst component and then the coated walls are subjected to a heat treatment at high temperature to be baked.

There is not any special restriction on a method for manufacturing the honeycomb structure of the embodiment, and the honeycomb structure can be manufactured by the following method, for example. First, a kneaded material having plasticity is prepared to obtain a honeycomb structure body. The kneaded material to prepare the honeycomb structure body can be prepared by suitably adding an additive such as a binder and water to raw material powder of a material selected from the group consisting of the above-mentioned suitable materials of the partition walls.

Next, by means of the extrusion of the prepared kneaded material, a pillar-shaped honeycomb formed body having the partition walls which defines a plurality of the cells and the circumferential wall arranged at the outermost circumference is obtained. In the extrusion, a die having a predetermined cell shape, a predetermined thickness of the partition walls, and a predetermined cell density is preferably used as the die for the extrusion.

The obtained honeycomb formed body is dried by microwaves and hot air, for example. Next, the open ends of the cells are plugged with the same material as that used for manufacturing the honeycomb formed body, and a plugging portion is provided, as needed. After the formation of the plugging portion, the honeycomb formed body may be further dried.

Next, the honeycomb formed body is fired to obtain a honeycomb structure. To manufacture the honeycomb structure of the embodiment, the firing time for firing a honeycomb formed body is preferably 80 hours or more. The honeycomb structure manufactured as above enables pores exposed on the partition wall surface of the honeycomb structure to be uniformly formed. The firing time for firing a honeycomb fonned body is more preferably from 60 to 100 hours and particularly preferably 100 hours. The firing temperature and the firing atmosphere vary in accordance with raw materials, and a person skilled in the art can select the firing temperature and the firing atmosphere suitable for a selected material. For example, to manufacture a honeycomb structure containing cordierite, the temperature of the firing atmosphere is preferably set to 1,400° C. The firing atmosphere for manufacturing a honeycomb structure containing cordierite is preferably nitrogen. To uniformly form pores open on the partition wall surface, a honeycomb formed body is preferably maintained at a maximum temperature for 15 hours or more.

A catalyst may be loaded onto the obtained honeycomb structure. There is not any special restriction on a method for loading the catalyst onto the honeycomb structure, and the method may include a method in which the partition walls of a honeycomb structure are wash-coated with a catalyst liquid containing a catalyst component and then the coated walls are subjected to a heat treatment at high temperature to be baked.

EXAMPLES

Example 1

To 100 parts by mass a cordierite forming raw material, 2.5 parts by mass of a pore former, 60 parts by mass of a dispersing medium, 5.6 parts by mass of an organic binder, and 30 parts by mass of a dispersing agent were added, and the whole was mixed and kneaded to obtain a kneaded material. As the cordierite forming raw material, alumina, aluminum hydroxide, kaolin, talc, and silica were used. As the dispersing medium, water was used; as the pore former, a water-absorbing polymer having an average particle diameter of 100 µm was used; as the organic binder, hydroxypropylmethyl cellulose was used; and as the dispersing agent, ethylene glycol was used. The water-absorbing polymer used was a particulate ammonium polyacrylate having a water-absorbing rate of 15 to 25 times and an average particle diameter of 100 µm after water absorption.

Next, the kneaded material was extruded by using a die for preparing a honeycomb formed body, a honeycomb formed body having a round pillar shape as a whole was obtained. The shape of the cell in the honeycomb formed body was a quadrangular shape.

The honeycomb formed body was then dried in a microwave dryer and further completely dried in a hot-air drier. Both end faces of the honeycomb formed body were cut down for adjustment to a predetermined size.

Next, the dried honeycomb formed body was degreased and fired, a honeycomb structure of Example 1 was manufactured. The degreasing was performed in a nitrogen atmosphere for 10 hours. The firing was performed in a nitrogen atmosphere by maintaining a maximum temperature for 15 hours to uniformly form pores open on the partition wall surface.

The honeycomb structure of Example 1 had a round pillar shape whose inflow end face and outflow end face had a circular shape. Each diameter of the inflow end face and the outflow end face was 266.7 mm. The length of the honeycomb structure in the cell extending direction was 152.4 mm. In the honeycomb structure of Example 1, the thickness of the partition wall was 0.114 mm, and the cell density was 93 cells/cm$^2$. Table 1 shows the diameter of the end faces of the honeycomb structure, the length of the honeycomb structure, the thickness of the partition wall, and the cell density.

In the honeycomb structure of Example 1, the porosity of the partition walls was 50%. The porosity of the partition walls was measured with a mercury porosimeter (Autopore 9500 manufactured by Micromeritics). The porosity column in Table 1 shows the porosity value of the partition walls.

The open frontal area, the pore density, the median opening diameter, and the circularity of the honeycomb structure of Example 1 were measured by the following methods. The open frontal area, the pore density, the median opening diameter, and the circularity were determined for the pores having an equivalent circle diameter of 10 µm or more among the pores open on the partition wall surface. Table 2 shows the measurement results of the open frontal area, the pore density, the median opening diameter, and the circularity.

[Open Frontal Area of Pores having Equivalent Circle Diameter of 10 µm or more]

A measurement sample having a size of a length of 20 mm, a width of 20 mm, and a height of 20 mm was cut out from the honeycomb structure body of the honeycomb structure of Example 1. SEM images were recorded in randomly three visual fields on the partition wall surface of the sample under a scanning electron microscope (SEM). The size of a visual field was the width between partition walls and a length of 2 mm in the cell extending direction. Next, each recorded image was binarized by an image analysis into cavity portions (i.e., pore portions) and portions other than the cavities (i.e., actual partition wall portions). The area of each cavity portion was determined. The equivalent circle diameter of each cavity portion was calculated by the determined area. The area of the cavity portions corresponding to the "pores having an equivalent circle diameter of 10 µm or more" was determined in the SEM image. The "open frontal area of the pores having an equivalent circle diameter of 10 µm or more" is calculated as the percentage of the determined area of the cavity portions divided by the area of the whole image. The open frontal area shown in Table 2 is the arithmetic mean value of the open frontal areas of the respective SEM images in the three visual fields.

[Pore Density of Pores having Equivalent Circle Diameter of 10 µm or More]

In the same manner as in the measurement method of the open frontal area of pores having an equivalent circle diameter of 10 µm or more, the equivalent circle diameter of each cavity portion in an SEM image was calculated. The number of the cavity portions corresponding to the "pores having an equivalent circle diameter of 10 µm or more" was obtained in the SEM image. The "pore density of the pores having an equivalent circle diameter of 10 µm or more" is calculated as the obtained number of the cavity portions divided by the area (mm$^2$) of the whole image. The pore density shown in Table 2 is the arithmetic mean value of the pore densities of the respective SEM images in the three visual fields.

[Median Opening Diameter of Pores having Equivalent Circle Diameter of 10 µm or More]

In the same manner as in the measurement method of the open frontal area of pores having an equivalent circle diameter of 10 µm or more, the equivalent circle diameter of each cavity portion in an SEM image was calculated. The pores corresponding to the respective cavity portions in the SEM image were classified into pores having an equivalent circle diameter of 10 µm or more and pores having an equivalent circle diameter of less than 10 µm. On the basis of the obtained equivalent circle diameters, a graph was prepared, where the vertical axis was a cumulative area (%) of pores open on the partition wall surface, and the horizontal axis was an equivalent circle diameter (µm). In the prepared graph, the value of the equivalent circle diameter (µm) of pores at the cumulative area corresponding to 50% of the total pore area is the "median opening diameter of the pores having an equivalent circle diameter of 10 µm or more".

[Circularity of Pores having Equivalent Circle Diameter of 10 µm or More]

In the same manner as in the measurement method of the open frontal area of pores having an equivalent circle diameter of 10 µm or more, the equivalent circle diameter of each cavity portion in an SEM image was calculated. The opening area of a pore the circularity of which was to be determined and the outline length of the pore were obtained. The opening area of a pore P whose circularity is to be obtained is regarded as $A_0$, and the outline length of the pore is regarded as L. The area of a circle having a circumferential length equal to L is regarded as $A_1$. The circularity of the pore P can be determined in accordance with Equation (1). The respective circularities of the "pores having an equivalent circle diameter of 10 µm or more" in the SEM image were calculated, and the arithmetic mean value of the calculated circularities was regarded as the "circularity of pores having an equivalent circle diameter of 10 µm or more".

$$\text{circularity of pore } P = A_1/A_0 \qquad \text{Equation (1)}$$

First, a catalyst slurry containing an predetermined catalyst was prepared. Next, the catalyst slurry was allowed to flow from one end face of the honeycomb structure of Example 1 into the cells. To allow the catalyst slurry to flow into the cells, dipping was performed. The loading amount of the catalyst was 298 g/L. The "catalyst amount" column in Table 3 shows the catalyst loading amount (g/L).

TABLE 1

| | End face diameter (mm) | Length (mm) | Thickness of partition wall (mm) | Cell density (cells/cm$^2$) | Pore former amount (parts by mass) | Pore former (average particle diameter: µm) | Porosity (%) |
|---|---|---|---|---|---|---|---|
| Example 1 | 266.7 | 152.4 | 0.114 | 93.0 | 2.5 | 100.0 | 50 |
| Example 2 | 266.7 | 152.4 | 0.140 | 62.0 | 1.7 | 70.0 | 45 |
| Example 3 | 266.7 | 152.4 | 0.114 | 93.0 | 3.3 | 130.0 | 55 |
| Example 4 | 266.7 | 152.4 | 0.140 | 62.0 | 4.9 | 150.0 | 65 |
| Example 5 | 266.7 | 152.4 | 0.140 | 62.0 | 1.7 | 100.0 | 45 |
| Example 6 | 266.7 | 152.4 | 0.140 | 62.0 | 4.6 | 100.0 | 63 |
| Example 7 | 266.7 | 152.4 | 0.140 | 62.0 | 4.9 | 100.0 | 65 |
| Comparative Example 1 | 266.7 | 152.4 | 0.114 | 93.0 | — | — | 35 |
| Comparative Example 2 | 266.7 | 152.4 | 0.140 | 62.0 | 5.7 | 130.0 | 70 |
| Comparative Example 3 | 266.7 | 152.4 | 0.114 | 93.0 | 2.5 | 20.0 | 50 |
| Comparative Example 4 | 266.7 | 152.4 | 0.140 | 62.0 | 1.7 | 20.0 | 45 |
| Comparative Example 5 | 266.7 | 152.4 | 0.114 | 93.0 | 1.4 | 50.0 | 43 |
| Comparative Example 6 | 266.7 | 152.4 | 0.114 | 93.0 | 1.7 | 70.0 | 45 |
| Comparative Example 7 | 266.7 | 152.4 | 0.114 | 93.0 | 2.5 | 50.0 | 50 |
| Comparative Example 8 | 266.7 | 152.4 | 0.114 | 93.0 | 4.9 | 150.0 | 65 |
| Comparative Example 9 | 266.7 | 152.4 | 0.114 | 93.0 | 1.7 | 100.0 | 45 |

TABLE 2

| | Open frontal area of pores having equivalent circle diameter of 10 µm or more (%) | Median opening diameter of pores having equivalent circle diameter of 10 µm or more (µm) | Pore density of pores having equivalent circle diameter of 10 µm or more (pores/mm$^2$) | Circularity |
|---|---|---|---|---|
| Example 1 | 30 | 50 | 500 | 2.5 |
| Example 2 | 20 | 40 | 400 | 1.8 |
| Example 3 | 35 | 57 | 650 | 2.9 |
| Example 4 | 40 | 60 | 700 | 3.2 |
| Example 5 | 20 | 48 | 350 | 2.3 |
| Example 6 | 38 | 42 | 1000 | 2.6 |
| Example 7 | 40 | 46 | 700 | 4 |
| Comparative Example 1 | 20 | 20 | 200 | 2.3 |
| Comparative Example 2 | 42 | 60 | 1100 | 3.3 |
| Comparative Example 3 | 24 | 30 | 350 | 2.5 |
| Comparative | 28 | 30 | 500 | 4.1 |

TABLE 2-continued

| | Open frontal area of pores having equivalent circle diameter of 10 μm or more (%) | Median opening diameter of pores having equivalent circle diameter of 10 μm or more (μm) | Pore density of pores having equivalent circle diameter of 10 μm or more (pores/mm²) | Circularity |
|---|---|---|---|---|
| Example 4 | | | | |
| Comparative Example 5 | 18 | 35 | 400 | 2.5 |
| Comparative Example 6 | 18 | 42 | 350 | 2.5 |
| Comparative Example 7 | 23 | 38 | 300 | 2.5 |
| Comparative Example 8 | 38 | 62 | 600 | 2.5 |
| Comparative Example 9 | 22 | 53 | 320 | 2.5 |

TABLE 3

| | Catalyst amount (g/L) | Percentage of increase in pressure loss after catalyst coating (%) | Catalyst filling ratio (%) | Isostatic strength (MPa) |
|---|---|---|---|---|
| Example 1 | 298 | 100 | 60 | 2.5 |
| Example 2 | 297 | 120 | 50 | 3.2 |
| Example 3 | 300 | 90 | 70 | 1.5 |
| Example 4 | 304 | 80 | 80 | 0.5 |
| Example 5 | 300 | 115 | 55 | 3.2 |
| Example 6 | 299 | 97 | 59 | 0.8 |
| Example 7 | 301 | 86 | 60 | 0.6 |
| Comparative Example 1 | 301 | 200 | 10 | 4.5 |
| Comparative Example 2 | 303 | 80 | 85 | 0.3 |
| Comparative Example 3 | 295 | 125 | 30 | 2.5 |
| Comparative Example 4 | 300 | 125 | 40 | 2.5 |
| Comparative Example 5 | 307 | 130 | 33 | 3.5 |
| Comparative Example 6 | 302 | 140 | 40 | 3.3 |
| Comparative Example 7 | 293 | 110 | 47 | 2.7 |
| Comparative Example 8 | 300 | 70 | 80 | 0.4 |
| Comparative Example 9 | 294 | 130 | 48 | 3 |

The "percentage of increase in pressure loss after catalyst coating (%)", the "catalyst filling ratio (%)", and the "isostatic strength (MPa)" of the honeycomb structure of Example 1 were evaluated by the following methods. The results are shown in Table 3.

[Percentage of Increase in Pressure Loss after Catalyst Coating (%)]

First, the difference of pressure between the inflow end face and the outflow end face of a honeycomb structure loaded with no catalyst was obtained at 25° C. The pressure loss value of the honeycomb structure with no catalyst obtained in this manner was regarded as "$P_0$". Separately, the difference of pressure between the inflow end face and the outflow end face of a honeycomb structure loaded with a catalyst in such a manner as to give the values shown in Table 3 was obtained at 25° C. The pressure loss value of the honeycomb structure with the catalyst obtained in this manner was regarded as "$P_1$". The value calculated in accordance with Equation (2) was referred to as the percentage of increase in pressure loss after catalyst coating (%). The acceptable value of the percentage of increase in pressure loss after catalyst coating (%) is 120% or less.

$$\text{percentage of increase in pressure loss after catalyst coating (\%)} = (P_1 - P_0)P_0 \times 100 \qquad \text{Equation (2):}$$

[Catalyst Filling Ratio (%)]

Figure 4:
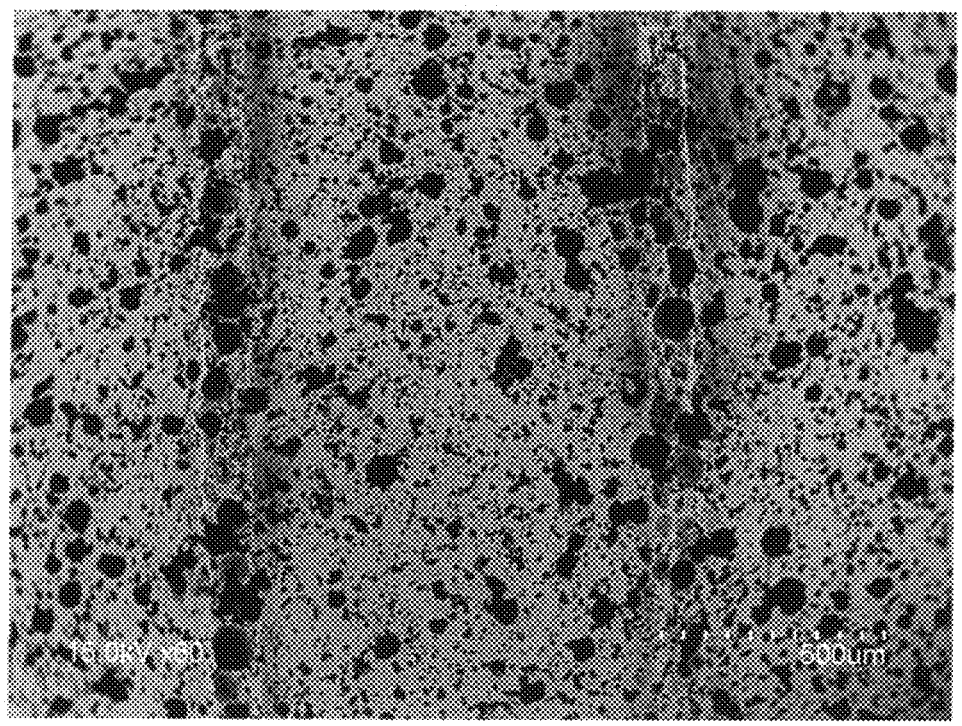
FIG. 4 is an SEM image of a sample cut out from a honeycomb structure body of a honeycomb structure in Example 1.

A measurement sample having a size of a length of 20 mm, a width of 20 mm, and a height of 20 mm was cut out from the honeycomb structure body of the honeycomb structure of Example 1. The partition wall portion of the sample was polished, and SEM images were recorded in randomly three visual fields under a scanning electron microscope (SEM). The size of a visual field was the width as one of partition wall and a length of 600 μm in the cell extending direction. Next, a catalyst was loaded onto the honeycomb structure, and the ratio (percentage) of the volume ($V_1$) of pores actually filled with the catalyst to the volume ($V_0$) of all the pores formed on the partition walls was calculated. Specifically, the volume ($V_0$) of all the pores formed on the partition walls was calculated from the pore portions extracted by the binarization using an image analysis (i.e., pores into which no catalyst penetrated and pores into which a catalyst penetrated). Next, a catalyst was loaded onto the honeycomb structure. The image analysis was performed to binarize pores, then the pore portions into which the catalyst penetrated were extracted, and the volume $V_1$ was calculated. By using these values, the catalyst filling ratio (%) was calculated. The catalyst filling ratio (%) value in Table 3 is the arithmetic mean value of the catalyst filling ratios of the respective SEM images in the three visual fields. When the catalyst filling ratio is less than 50%, the catalyst amount on the partition wall surface may increase, thus the catalyst may be separated from the carrier at the time of actual use, and the purification performance may deteriorate. Hence, the acceptable value is 50% or more. FIG. 4 shows an SEM image of a sample cut out from the honeycomb structure body of the honeycomb structure in Example 1.

[Isostatic Strength (MPa)]

An isostatic strength was measured on the basis of an isostatic breakdown strength test stipulated in a car standard (JASO Standard) M505-87 issued by the society of Automotive Engineers of Japan. The isostatic breakdown strength test is a test of placing the honeycomb structure in a tubular container of rubber and closing the container with a lid made of an aluminum plate to perform an isotropic pressurizing compression in water. That is, the isostatic breakdown strength test is a test which simulates a compressive load application in a case of holding a circumferential surface of the honeycomb structure in a can member. The isostatic strength measured by this isostatic breakdown strength test is indicated by an adding pressure value (MPa) when the honeycomb structure breaks. The acceptable value of the isostatic strength (MPa) is 0.5 MPa or more.

Example 2

In Example 2, the manufacturing method of the honeycomb structure in Example 1 was repeated except that the thickness of the partition wall was 0.140 mm, the number of cells was 62 cells/cm², the amount of the pore former was 1.7 parts by mass, and the average particle diameter of the pore former was 70 μm, to manufacture a honeycomb structure.

Example 3

In Example 3, the manufacturing method of the honeycomb structure in Example 1 was repeated except that the amount of the pore former was 3.3 parts by mass and the average particle diameter of the pore former was 130 μm, to manufacture a honeycomb structure.

Example 4

In Example 4, the manufacturing method of the honeycomb structure in Example 1 was repeated except that the thickness of the partition wall was 0.140 mm, the number of cells was 62 cells/cm$^2$, the amount of the pore former was 4.9 parts by mass, and the average particle diameter of the pore former was 150 μm, to manufacture a honeycomb structure.

Example 5

In Example 5, the manufacturing method of the honeycomb structure in Example 1 was repeated except that the thickness of the partition wall was 0.140 mm, the number of cells was 62 cells/cm$^2$, and the amount of the pore former was 1.7 parts by mass, to manufacture a honeycomb structure.

Example 6

In Example 6, t the manufacturing method of the honeycomb structure in Example 1 was repeated except that the thickness of the partition wall was 0.140 mm, the number of cells was 62 cells/cm$^2$, and the amount of the pore former was 4.6 parts by mass, to manufacture a honeycomb structure.

Example 7

In Example 7, the manufacturing method of the honeycomb structure in Example 1 was repeated except that the thickness of the partition wall was 0.140 mm, the number of cells was 62 cells/cm$^2$, and the amount of the pore former was 4.9 parts by mass, to manufacture a honeycomb structure.

The thickness of partition wall, the cell density, the porosity, the open frontal area, the median opening diameter, the pore density, and the circularity of each honeycomb structure of Examples 2 to 7 were measured in the same manner as in Example 1. The results are shown in Table 1 and Table 2. A catalyst was loaded onto each honeycomb structure of Examples 2 to 7 in such a manner as to give the catalyst amount (g/L) shown in Table 3. Next, the "percentage of increase in pressure loss after catalyst coating (%)", the "catalyst filling ratio (%)", and the "isostatic strength (MPa)" were evaluated in the same manner as in Example 1. The results are shown in Table 3.

Comparative Examples 1 to 9

Figure 5:
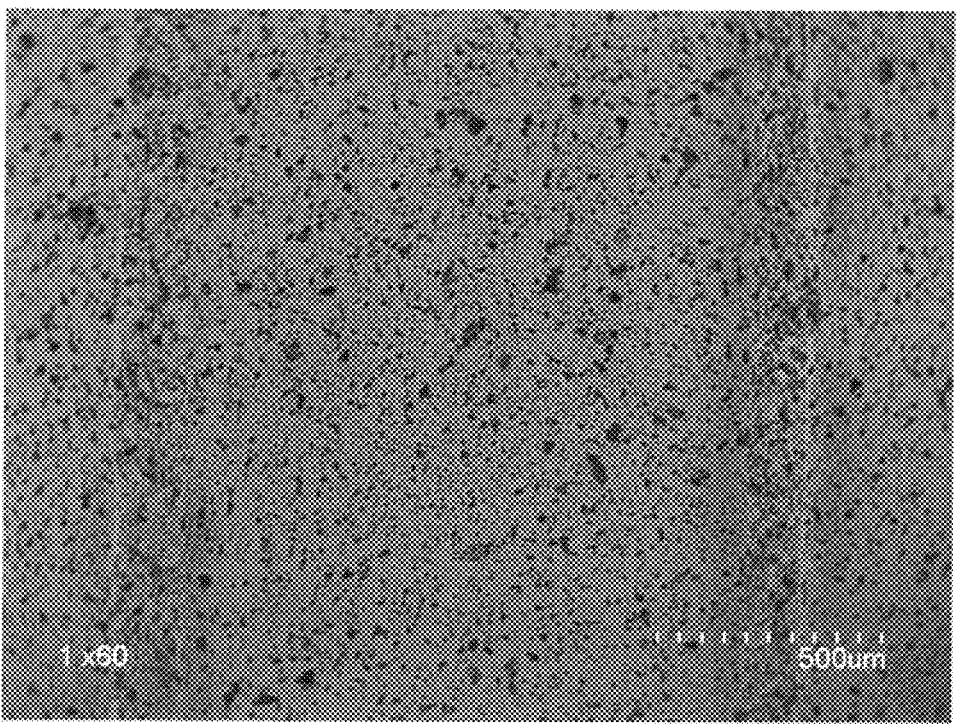
FIG. 5 is an SEM image of a sample cut out from a honeycomb structure body of a honeycomb structure in Comparative Example 1.

Honeycomb structures of Comparative Examples 1 to 9 were manufactured by the following procedures, and the thickness of partition wall, the cell density, the porosity, the open frontal area, the median opening diameter, the pore density, and the circularity of each honeycomb structure were measured in the same manner as in Example 1. The results are shown in Table 1 and Table 2. A catalyst was loaded onto each honeycomb structure of Comparative Examples 1 to 9 in such a manner as to give the catalyst amount (g/L) shown in Table 3. Next, the "percentage of increase in pressure loss after catalyst coating (%)", the "catalyst filling ratio (%)", and the "isostatic strength (MPa)" were evaluated in the same manner as in Example 1. The results are shown in Table 3. FIG. 5 shows an SEM image of a sample cut out from the honeycomb structure body of the honeycomb structure in Comparative Example 1.

In Comparative Example 1, the manufacturing method of the honeycomb structure in Example 1 was repeated except that no pore former was added, to manufacture a honeycomb structure.

In Comparative Example 2, the manufacturing method of the honeycomb structure in Example 1 was repeated except that the thickness of the partition wall was 0.140 mm, the number of cells was 62 cells/cm$^2$, the amount of the pore former was 5.7 parts by mass, and the average particle diameter of the pore former was 130 μm, to manufacture a honeycomb structure.

In Comparative Example 3, the manufacturing method of the honeycomb structure in Example 1 was repeated except that the average particle diameter of the pore former was 20 μm, to manufacture a honeycomb structure.

In Comparative Example 4, the manufacturing method of the honeycomb structure in Example 1 was repeated except that the thickness of the partition wall was 0.140 mm, the number of cells was 62 cells/cm$^2$, the amount of the pore former was 1.7 parts by mass, and the average particle diameter of the pore former was 20 μm, to manufacture a honeycomb structure.

In Comparative Example 5, the manufacturing method of the honeycomb structure in Example 1 was repeated except that the amount of the pore former was 1.4 parts by mass and the average particle diameter of the pore former was 50 μm, to manufacture a honeycomb structure.

In Comparative Example 6, the manufacturing method of the honeycomb structure in Example 1 was repeated except that the amount of the pore former was 1.7 parts by mass and the average particle diameter of the pore former was 70 μm, to manufacture a honeycomb structure.

In Comparative Example 7, the manufacturing method of the honeycomb structure in Example 1 was repeated except that the average particle diameter of the pore former was 50 μm, to manufacture a honeycomb structure.

In Comparative Example 8, the manufacturing method of the honeycomb structure in Example 1 was repeated except that the amount of the pore former was 4.9 parts by mass and the average particle diameter of the pore former was 150 μm, to manufacture a honeycomb structure.

In Comparative Example 9, the manufacturing method of the honeycomb structure in Example 1 was repeated except that the amount of the pore former was 1.7 parts by mass, to manufacture a honeycomb structure.

[Results]

Each honeycomb structure of Examples 1 to 7 gave satisfactory results in the evaluations of the percentage of increase in pressure loss after catalyst coating, the catalyst filling ratio, and the isostatic strength.

The honeycomb structure of Comparative Example 1 had an extremely low catalyst filling ratio which was 10% and a percentage of increase in pressure loss was 200% after catalyst coating.

The honeycomb structure of Comparative Example 2 satisfied the acceptance values of the percentage of increase in pressure loss after catalyst coating and the catalyst filling ratio, it had however a markedly low isostatic strength.

The honeycomb structure of Comparative Example 3 had a low catalyst filling ratio which was 30% and a percentage of increase in pressure loss was 125% after catalyst coating.

In the honeycomb structure of Comparative Example 4, a percentage of increase in pressure loss was 125% after catalyst coating.

The honeycomb structure of Comparative Example 5 had a low catalyst filling ratio which was 33% and a percentage of increase in pressure loss was 130% after catalyst coating.

The honeycomb structure of Comparative Example 6 had a low catalyst filling ratio which was 40% and a percentage of increase in pressure loss was 140% after catalyst coating.

The honeycomb structure of Comparative Example 7 had a low catalyst filling ratio which was 47%.

The honeycomb structure of Comparative Example 8 had an isostatic strength which was 0.4 MPa.

The honeycomb structure of Comparative Example 9 had a low catalyst filling ratio which was 48% and a percentage of increase in pressure loss was 130% after catalyst coating.

The honeycomb structure of the present invention can be used as an exhaust gas purification member for purification of the exhaust gas emitted from gasoline engines, diesel engines, and the like.

DESCRIPTION OF REFERENCE NUMERALS

1: partition wall, 2: cell, 3: circumferential wall, 4: honeycomb structure body, 11: inflow end face, 12: outflow end face, 100: honeycomb structure

What is claimed is:

1. A honeycomb structure comprising:
a honeycomb structure body including porous partition walls defining a plurality of cells serving as fluid passages extending from an inflow end face to an outflow end face;
wherein a porosity of the partition walls is from 45 to 65%, an open frontal area of pores having an equivalent circle diameter of 10 μm or more among pores open on surfaces of partition walls of the entire honeycomb structure is from 20 to 40%, a pore density of pores having an equivalent circle diameter of 10 μm or more among pores open on surfaces of partition walls is from 350 to 1,000 pores/mm$^2$, a median opening diameter of pores having an equivalent circle diameter of 10 μm or more among pores open on surfaces of partition walls of the entire honeycomb structure is from 42 to 60 μm, where the median opening diameter is a median value of the equivalent circle diameters, and
wherein a thickness of the partition walls is from 89 to 203 μm.

2. The honeycomb structure according to claim 1, wherein a circularity of pores having an equivalent circle diameter of 10 μm or more among pores open on surfaces of partition walls is from 1.8 to 4.0.

3. The honeycomb structure according to claim 1, wherein a cell density of the honeycomb structure body is from 31 to 140 cells/cm$^2$.

4. The honeycomb structure according to claim 1, wherein the partition walls are formed from at least one material selected from the group consisting of cordierite, silicon carbide, silicon nitride, and mullite.

5. The honeycomb structure according to claim 1, further comprising a plugging portion configured to plug either one end of the cells formed in the honeycomb structure body.

6. The honeycomb structure according to claim 1, wherein a catalyst for purification of an exhaust gas is loaded onto at least one of the surfaces of partition walls and pores of the partition walls of the honeycomb structure body.

7. The honeycomb structure according to claim 6, used for a purification of NOx contained in an exhaust gas emitted from an automobile.

8. The honeycomb structure according to claim 6, wherein the catalyst is a catalyst having a selective catalytic reduction function.

9. The honeycomb structure according to claim 1, wherein the thickness of the partition walls is from 89 to 140 μm.

* * * * *